No. 785,354.    Patented March 21, 1905.

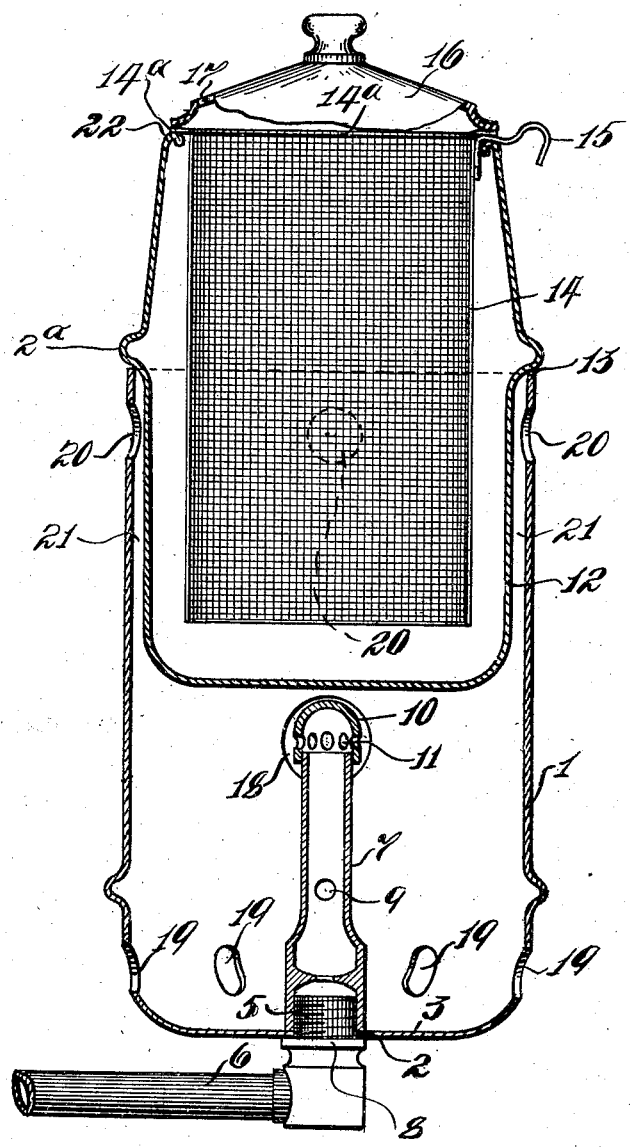

UNITED STATES PATENT OFFICE.

HORACE N. FOWLER, OF PHILADELPHIA, PENNSYLVANIA.

STERILIZER.

SPECIFICATION forming part of Letters Patent No. 785,354, dated March 21, 1905.

Application filed November 7, 1904. Serial No. 231,691.

*To all whom it may concern:*

Be it known that I, HORACE N. FOWLER, a resident of Philadelphia, county of Philadelphia and State of Pennsylvania, have invented certain new and useful Improvements in Sterilizers, of which the following is a specification.

My invention relates to an improved sterilizer in which it is aimed to consume all of the gases of combustion and also to provide a simple means by which small articles may be thoroughly sterilized, the entire device being adapted to be detachably secured to an ordinary gas-fixture.

To these and other ends, which will hereinafter appear, the invention consists in the novel features of improvement and combination and arrangement of parts hereinafter described, and finally summarized in the appended claims.

Reference is to be had to the accompanying drawing, forming part hereof, which illustrates a vertical central section of my improved device.

Referring to the drawing, 1 indicates a suitable drum or casing, which has an opening 2 in the bottom 3 thereof, the said opening being large enough to permit of the free passage of the nipple end 5 of a gas-pipe 6. When the burner 7 is screwed onto the nipple 5 as far as it will go, it will force the bottom 3 of the drum or casing 1 against the shoulder 8 of the fitting, thereby securely holding said casing in place. The burner 7 in my device is of the Bunsen pattern, whereby a great heat is obtained, the said burner being provided with the usual air-inlet 9 and with a cap 10, provided with openings 11, from which the flame emanates and impinges against the bottom of a reservoir 12, which is adapted to contain water or a sterilizing fluid. The reservoir 12 is provided with a circumferential bead or ridge $12^a$ and rests upon the casing 1 at the point 13 when in position. By this construction the reservoir 12 can be readily removed and fluid changed without taking the casing from the burner. As an extra means for sterilizing and one in which small articles may be placed, I provide a basket 14, the same being made of woven wire or perforated plates, as desired, the basket being held in suspension within the reservoir by a circumferential flange or lip $14^a$ and is also provided with a hook 15, by which it may be handled and also be suspended from the outside upon the top edge of reservoir 12. A cap or cover 16 is provided in which there is an opening 17, through which opening excessive steam may escape. If the basket 14 is not intended to be used, it may be removed and the articles hung or placed directly in the reservoir proper.

In the casing 1 there is an opening 18, through which the burner can be seen for the purpose of ignition and regulation. I also provide air-inlets 19 at or near the bottom of the casing and outlets 20 at the upper portion thereof, as shown. The space 21 between the casing 1 and reservoir 12 permits of a free circulation of heated air around the reservoir, the openings 19 at the bottom of the casing admitting the air and the openings 20 at the top letting out the gases of combustion, whereby a circulation of hot air is created around the sides as well as at the bottom of the reservoir 12, containing the sterilizing fluid. The casing confines the hot air and prevents the flame from being extinguished by gusts of air. The top edge 22 of the reservoir 12 is turned inwardly, as shown, to prevent the boiling over of the liquid.

I do not wish to limit myself to the precise details of construction shown and described, as the same may be varied in many particulars without departing from the spirit of my invention, and it will of course be understood that wherever in the foregoing specification and appended claims I speak of a "gas-pipe" any gas fixture, bracket, or the like is intended to be covered thereby.

Having described my invention, what I claim, and desire to secure by Letters Patent, is—

1. A sterilizer adapted to be attached to a gas-pipe, comprising a casing, the same being provided in its bottom with an opening adapted to permit of the passage of the nipple end of the gas-pipe, a burner adapted to be screwed onto said nipple end and to securely hold the casing in place, and a fluid-receptacle suspended within said casing and adapted to receive the flame from said burner for heating the fluid therein.

2. A sterilizer adapted to be attached to the nipple end of a gas-pipe, comprising a casing, the same being provided with an opening in its bottom adapted to permit of the free passage of the said nipple end, a Bunsen burner adapted to be screwed onto the nipple end of said gas-pipe, the said burner being adapted to securely hold said casing in position, and a fluid-chamber within said casing adapted to receive the heat from said burner, and a detachable secondary receptacle within said fluid-chamber, substantially as described.

3. A device of the character described, comprising a casing having air-inlet openings at the bottom thereof, air-outlet openings at the upper portion thereof, an ignition-opening intermediate the air inlet and outlet openings, a fluid-receptacle provided with means for suspending the same within the casing, a lid or cover for the fluid-receptacle, the said lid being provided with a vent-opening, combined with a burner adapted to heat the air within the casing, substantially as and for the purpose herein shown and described.

HORACE N. FOWLER.

Witnesses:
G. A. SCHWAB,
H. F. MATTER.